(12) United States Patent
Simanovsky et al.

(10) Patent No.: US 9,846,935 B2
(45) Date of Patent: Dec. 19, 2017

(54) SEGMENTATION OF SHEET OBJECTS FROM IMAGE GENERATED USING RADIATION IMAGING MODALITY

(75) Inventors: Sergey Simanovsky, Brookline, MA (US); Julia Pavlovich, Revere, MA (US); Ram Naidu, Newton, MA (US)

(73) Assignee: ANALOGIC CORPORATION, Peabody, MA (US)

(*) Notice: Subject to any disclaimer, the term of this patent is extended or adjusted under 35 U.S.C. 154(b) by 124 days.

(21) Appl. No.: 14/403,292

(22) PCT Filed: May 31, 2012

(86) PCT No.: PCT/US2012/040200
§ 371 (c)(1),
(2), (4) Date: Nov. 24, 2014

(87) PCT Pub. No.: WO2013/180717
PCT Pub. Date: Dec. 5, 2013

(65) Prior Publication Data
US 2015/0187069 A1    Jul. 2, 2015

(51) Int. Cl.
*G06K 9/00*    (2006.01)
*G06T 7/00*    (2017.01)
(Continued)

(52) U.S. Cl.
CPC .......... *G06T 7/0012* (2013.01); *G01V 5/0008* (2013.01); *G06K 9/4609* (2013.01);
(Continued)

(58) Field of Classification Search
None
See application file for complete search history.

(56) References Cited

U.S. PATENT DOCUMENTS 6,078,642 A * 6/2000 Simanovsky ...... G06K 9/00771
378/15
6,108,396 A * 8/2000 Bechwati ......... G06K 9/00771
378/15
(Continued)

FOREIGN PATENT DOCUMENTS

EP    1612721 A1    1/2006
JP    2002503816 A    2/2002

OTHER PUBLICATIONS

Korean Office Action in Japanese Application No. 2015-514972 dated Mar. 1, 2016, 2 pgs.
(Continued)

*Primary Examiner* — Matthew Bella
*Assistant Examiner* — Jose M Torres
(74) *Attorney, Agent, or Firm* — Cooper Legal Group, LLC (57) ABSTRACT

Among other things, one or more systems and/or techniques for segmenting a representation of a sheet object from an image are provided herein. To identify elements of an image (e.g., pixels and/or voxels) representative of sheet objects, a constant false alarm rate (CFAR) score and a topological score are computed for respective elements being analyzed. The CFAR score indicates a relationship between an element and a neighborhood of elements when viewed as a collective unit. The topological score indicates a relationship between the element and a neighborhood of elements when viewed neighbor-by-neighbor. When the CFAR score is within a specified range of CFAR scores and the topological score is within a specified range of topological scores, the element is labeled as being associated with a sheet object. A connected component labeling (CCL) approach may be used to group elements labeled as being associated with a sheet object.

20 Claims, 5 Drawing Sheets

(51) Int. Cl.
*G06T 7/10* (2017.01)
*G01V 5/00* (2006.01)
*G06K 9/46* (2006.01)
*G06K 9/52* (2006.01)
*G06T 7/11* (2017.01)

(52) U.S. Cl.
CPC .................. *G06K 9/52* (2013.01); *G06T 7/10* (2017.01); *G06T 7/11* (2017.01); *G06K 2009/4666* (2013.01); *G06T 2207/10081* (2013.01); *G06T 2207/30112* (2013.01)

(56) References Cited

U.S. PATENT DOCUMENTS

| | | | |
|---|---|---|---|
| 6,111,974 A | | 8/2000 | Hiraoglu et al. |
| 6,128,365 A | * | 10/2000 | Bechwati ........... G06K 9/00771 378/4 |
| 6,272,230 B1 | * | 8/2001 | Hiraoglu ............ G06K 9/00771 250/363.04 |
| 9,157,873 B2 | * | 10/2015 | Gudmundson ...... G01N 23/046 |
| 2005/0036689 A1 | | 2/2005 | Mahoavieh |
| 2005/0226360 A1 | | 10/2005 | Kaucic, Jr. et al. |
| 2010/0329556 A1 | | 12/2010 | Mitarai et al. |
| 2012/0121168 A1 | | 5/2012 | Pavlovich et al. |
| 2013/0170723 A1 | * | 7/2013 | Kwon ................... G06T 7/0079 382/131 |

OTHER PUBLICATIONS

International Search Report in related application No. PCT/US2012/040200 dated Feb. 27, 2013, pp. 12.

\* cited by examiner

SEGMENTATION OF SHEET OBJECTS FROM IMAGE GENERATED USING RADIATION IMAGING MODALITY

BACKGROUND

The present application relates to the field of X-ray and computed tomography (CT). It finds particular application with security systems configured to image an object and/or to identify potential threat items within an object that is presently or was previously under examination. It also relates to medical, industrials, and/or other applications where identifying sub-objects (e.g., sheet objects or thin objects) within an object under examination would be useful.

Security at airports and in other travel related areas is an important issue given today's sociopolitical climate, as well as other considerations. One technique used to promote travel safety is baggage inspection. Often, a radiation imaging modality is utilized to facilitate baggage screening. For example, a CT system may be used to provide security personnel with two and/or three dimensional views of objects. After viewing images provided by the imaging apparatus, security personnel may make a decision as to whether the baggage is safe to pass through a security check-point or if further (hands-on) inspection is warranted.

To reduce human error associated with identifying potential threat items inside the baggage, automated object recognition systems may be utilized. Such systems can extract a sub-object from an image, and compute properties of the sub-object based upon properties/elements of the image or representation of the sub-object. Computed properties of the sub-object can then be used for discriminating a sub-object by comparing the sub-object's properties (e.g., density, effective atomic number, shape, etc.) with known properties of threat items, non-threat items, and/or both classes of items, etc.

To accurately compute a sub-object's properties, a representation of the sub-object is typically segmented from portions of the image representative of other sub-objects. Algorithms utilized to segment the image (e.g., to isolate sub-objects in the image) may depend upon, among other things, the size and/or shape of the sub-object. Accordingly, algorithms utilized to segment sheet objects (e.g., also referred to as thin objects) may be different than algorithms utilized to segment bulk (e.g., non-thin) objects.

U.S. Pat. No. 6,111,974, assigned to Analogic Corporation and incorporated herein by reference, describes one approach for segmenting a sheet object from other sub-objects represented in an image, such as by identifying sheet voxels, for example. While such technique have proven effective, surfaces of some bulk objects may be difficult to distinguish from sheet objects. As such, voxels associated with surfaces of bulk objects may sometimes be mislabeled as voxels associated with a sheet (e.g., and trigger a false alarm during threat detection).

SUMMARY

Aspects of the present application address the above matters, and others. According to one aspect a method for segmenting a sheet object represented in an image generated from a radiation imaging modality is provided. The method comprises identifying a plurality of elements in the image, respective elements associated with a value. The method also comprises, for a first element of the plurality of elements, selecting a first plurality of neighboring elements in spatial proximity to the first element to define a first neighborhood and a second plurality of neighboring elements in spatial proximity to the first element to define a second neighborhood. The method also comprises computing a constant false alarm rate (CFAR) score for the first element, the CFAR score determined by comparing the value associated with the first element to a statistical measure for the first neighborhood. The method further comprises computing a topological score for the first element, the topological score determined by comparing the value associated with the first element to respective values associated with elements comprised within the second neighborhood, and labeling the first element as being associated with the sheet object when the CFAR score is within a first specified range and when the topological score is within a second specified range.

According to another aspect, a security imaging modality is provided. The imaging modality comprises an object segmentation component configured to segment a sheet object from other sub-objects represented in an image. The object segmentation component comprises a constant false alarm rate (CFAR) component configured to compute a CFAR score for a first element of the image by comparing a value associated with the first element to a statistical measure for a first neighborhood of elements. The object segmentation component also comprises a topological component configured to compute a topological score for the first element by comparing the value associated with the first element to respective values associated with elements comprised within a second neighborhood of elements and a labeling component configured to label the first element as being associated with the sheet object when the CFAR score is within a first specified range and when the topological score is within a second specified range to facilitate segmenting the sheet object from the other sub-objects represented in the image.

According to another aspect, a computer readable medium comprising computer executable instructions that when executed via a processing unit perform a method for identifying sheet objects in an object examined by a security imaging modality is provided. The method comprises identifying a plurality of elements in an image of the object, respective elements associated with a value. The method also comprises, for a first element of the plurality of elements, selecting a first plurality of neighboring elements in spatial proximity to the first element to define a first neighborhood and a second plurality of neighboring elements in spatial proximity to the first element to define a second neighborhood. The method also comprises computing a constant false alarm rate (CFAR) score for the first element, the CFAR score determined by comparing the value associated with the first element to a statistical measure for the first neighborhood. The method further comprises computing a topological score for the first element, the topological score determined by comparing the value associated with the first element to respective values associated with elements comprised within the second neighborhood and labeling the first element as being associated with the sheet object when the CFAR score is within a first specified range and when the topological score is within a second specified range.

Those of ordinary skill in the art may appreciate still other aspects of the present application upon reading and understanding the appended description.

FIGURES

The application is illustrated by way of example and not limitation in the figures of the accompanying drawings, in which like references generally indicate similar elements and in which.

DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques for identifying elements of an image representative of a sheet object (also referred to as a thin object) and/or segmenting the sheet object from other sub-objects represented in the image using the identified elements are provided for herein. As used herein, an element may refer to a pixel of a two-dimensional image and/or a voxel of a three-dimensional image, four-dimensional image, etc. Respective elements of the image are analyzed to compute a constant false alarm rate (CFAR) score and a topological score for the element being analyzed by comparing the element to neighboring elements. Based upon these two scores, a determination may be made regarding whether the element is or is not representative of a sheet object, and the element may be labeled accordingly. A standard connected components labeling (CCL) approach may then be utilized to group neighboring sheet elements to form a completed representation of the (potential) sheet object (e.g., which is segmented from other objects represented in the image).

A CFAR score is typically determined by comparing a value associated with the element being analyzed to a statistical measure (e.g., such as a mean value) for a first set of neighboring elements (e.g., a first neighborhood), and a topological score is typically determined by comparing the value associated with the element being analyzed to a corresponding value of respective neighboring elements of a second set of neighboring elements (e.g., a second neighborhood), which may comprise that same elements as the first set of neighboring elements and/or may comprise different elements. Thus, whereas the CFAR score indicates how different the value of an element is from neighboring elements when viewed as a collective unit (represented by the mean value), the topological score is indicative of how different the value of an element is from neighboring elements when compared one-by-one (e.g., to determine how many neighboring elements have a value within a specified threshold of the value of the element being analyzed).

The type of values being compared may be a function of the available data regarding respective elements. For example, where the image is acquired from a single-energy CT examination, CT (e.g., density) values of respective elements may be compared. Where the image is acquired from a dual-energy CT examination additional information may be available and utilized for the comparison. For example, in one embodiment, z-effective values associated with respective elements in an image may be compared. Other types of values that may be compared include, but are not limited to, a Compton score value and/or a material property value, such as a plastic property value and/or aluminum property value (e.g., indicative of how likely it is that the element represents an object comprising a specified material).

It may be appreciated that neighbor, (first and/or second) neighborhood, and/or the like are used herein in a broad sense to describe elements in terms of a spatial relationship, where the definition of what constitutes a neighbor may be flexible and may be determined on an instance-by-instance basis. By way of example, in one embodiment, neighboring elements may be defined to comprise some or all of the elements that are adjacent to an element being analyzed. In another embodiment, neighboring elements may be defined to comprise at least some elements that are separated from the element being analyzed by 0-1 (or other number of) other elements. Thus, the neighborhood of elements may be varied depending upon the application/environment, with some applications defining what constitutes a neighbor more narrowly than other applications, for example. Moreover, although a neighborhood of elements typically does not comprise the element being analyzed, it may be appreciated that in some embodiments, for some purposes, the element being analyzed may be included in the neighborhood of elements. For example, in one embodiment, the value associated with the element being analyzed may be included when computing a mean value of the neighborhood for a CFAR score, for example. In such a situation, for example, a plurality of neighboring elements in spatial proximity to a first element may include the first element (e.g., the element being analyzed). Moreover, even though the value associated with the first element may be included for computing a CFAR score for the first element, the value associated with the first element may not be included when computing a topological score for the first element, for example. A first neighborhood of elements utilized to compute the CFAR score and a second neighborhood of elements utilized to compute the topological score may thus be identical, may partially overlap (e.g., such that at least one element of the first neighborhood is also comprised in the second neighborhood), or may be non-overlapping (e.g., such that there are no elements in common between the first and second neighborhoods).

Further, it may be appreciated that as used herein, terms such as thin objects, sheet objects, and/or the like are used in a broad sense to described objects that have at least one dimension (and possibly two dimensions) that are disproportionately small relative to the other dimension(s) (e.g., typically the measurement in at least one dimension is nominal). For example, a sheet of paper may be considered a sheet object because of its nearly planar appearance (e.g., where the length and width are disproportionally sized relative to its depth/thickness). As such, when a three-dimensional (3D) image of a sheet object is generated, the number of voxels representing the object in one dimension or two dimensions may be far outnumbered by the number of voxels representing the object in the other two dimensions or other one dimension, respectively, for example.

Figure 1:
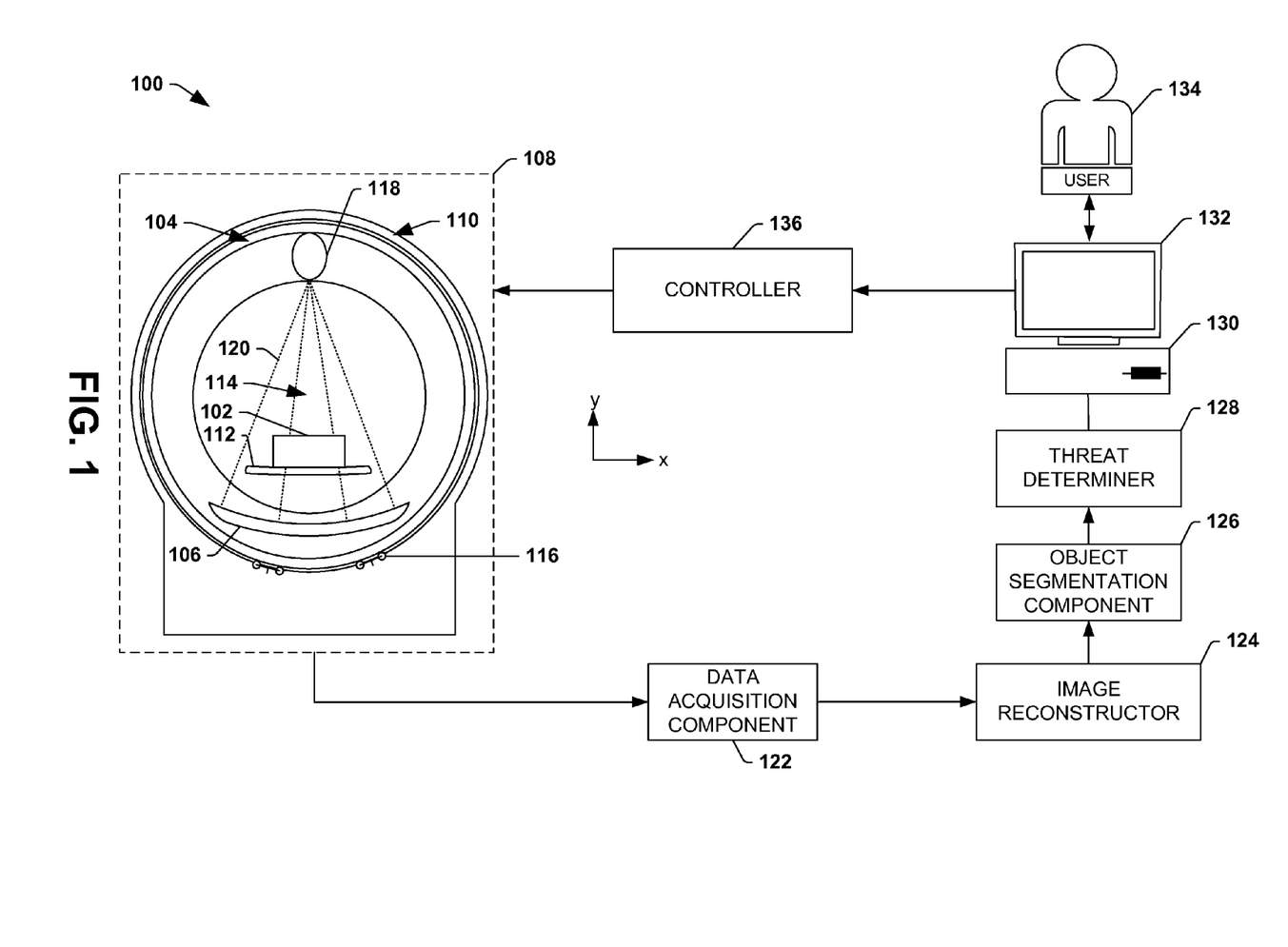
FIG. 1 illustrates an example environment of an imaging modality.

FIG. 1 is an illustration of an example environment 100 comprising a computed tomography (CT) system that may be configured to generate images representative of an object 102 (e.g., baggage, patient, etc.) or aspect(s) thereof under examination and detect/segment sheet objects from other aspects of the object 102 represented in the generate image(s). Such an example system may be employed for identifying potential threat containing objects, from a class of objects, inside baggage that has been subjected to imaging, for example.

It may be appreciated that while the example environment 100 describes a CT system configured to generate two-dimensional and/or three-dimensional images of the object 102 under examination (or previously under examination), other radiation imaging modalities are also contemplated for generating images from which sheet objects may be segmented for detection. For example, line systems and/or projection systems may be utilized to generate two-dimensional images from which sheet objects may be segmented for detection. Moreover, the arrangement of components and/or the types of components included in the example environment 100 are merely provided as an example arrangement. By way of example, in another embodiment, the data acquisition component 122 may be comprised within the detector array 106.

In the example environment 100, an examination unit 108 of the CT system is configured to examine one or more objects 102. The examination unit 108 can comprise a rotating gantry 104 and a (stationary) support structure 110 (e.g., which may encase and/or surround at least a portion of the rotating gantry 104 (e.g., as illustrated with an outer, stationary ring, surrounding an outside edge of an inner, rotating ring)). During an examination of the object(s) 102, the object(s) 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object(s) 102 by a rotator 116, such as a motor, drive shaft, chain, roller truck, etc.

The rotating gantry 104 may surround a portion of the examination region 114 and may comprise one or more radiation sources 118 (e.g., an ionizing x-ray source, gamma radiation source, etc.) and a detector array 106 that is mounted on a substantially diametrically opposite side of the rotating gantry 104 relative to the radiation source(s) 118.

During an examination of the object(s) 102, the radiation source(s) 118 emits fan, cone, wedge, and/or other shaped radiation 120 configurations from a focal spot(s) of the radiation source(s) 118 (e.g., a region within the radiation source(s) 118 from which radiation 120 emanates) into the examination region 114. It may be appreciated that such radiation 120 may be emitted substantially continuously and/or may be emitted intermittently (e.g., a brief pulse of radiation is emitted followed by a resting period during which the radiation source 118 is not activated).

As the emitted radiation 120 traverses the object(s) 102, the radiation 120 may be attenuated differently by different aspects of the object(s) 102. Because different aspects attenuate different percentages of the radiation 120, an image(s) may be generated based upon the attenuation, or variations in the number of photons that are detected by the detector array 106. For example, more dense aspects of the object(s) 102, such as a bone or metal plate, may attenuate more of the radiation 120 (e.g., causing fewer photons to strike the detector array 106) than less dense aspects, such as skin or clothing.

The detector array 106 is configured to directly convert (e.g., using amorphous selenium and/or other direct conversion materials) and/or indirectly convert (e.g., using photo-detectors and/or other indirect conversion materials) detected radiation into signals that can be transmitted from the detector array 106 to a data acquisition component 122 configured to compile signals that were transmitted within a predetermined time interval, or measurement interval, using various techniques (e.g., integration, photon counting, etc.). It may be appreciated that such a measurement interval may be referred to as a "view" and generally reflects signals generated from radiation 120 that was emitted while the radiation source 118 was at a particular angular range relative to the object 102. Based upon the compiled signals, the data acquisition component 122 can generate projection data indicative of the compiled signals, for example.

The example environment 100 further comprises an image reconstructor 124 configured to receive the projection data that is output by the data acquisition component 122. The image reconstructor 124 is configured to generate image data (also referred to as image(s)) from the projection data using a suitable analytical, iterative, and/or other reconstruction technique (e.g., backprojection reconstruction, tomosynthesis reconstruction, iterative reconstruction, etc.). In this way, the data is converted from projection space to image space, a domain that may be more understandable by a user 134 viewing the image(s), for example.

In the example environment 100, an object segmentation component 126 may be configured to receive the image data and to segment sheet objects from other sub-objects represented in the image data. By way of example, an image of a suitcase may illustrate clothes, a hair dryer, grooming products, a thin sheet explosive, and/or other components within the suitcase, and the object segmentation component 126 may segment the pixels/voxels of the image data representative of the thin sheet explosive from pixels/voxels representative of other objects. In this way, a portion of the image representative of an object that is of potential interest may be cut out of the image, for example, to be viewed/examined in isolation (e.g., apart from elements of the image representative of other sub-objects). Moreover, although specific reference is made to the object segmentation component 126 being configured to segment sheet objects, the object segmentation component 126 may be configured to segment more than just sheet objects, such as bulk objects using the same and/or different algorithms (e.g., as further described in U.S. Pat. No. 6,111,974). In this way, representations of components within the suitcase may be isolated and analyzed individually (e.g., instead of and/or in addition to analyzing the image of the suitcase as a whole).

In the example environment 100, a threat determiner 128 can receive the image data from the image reconstructor 124 and/or the segmented image data from the object segmentation component 126. The threat determiner 128 can be configured to compare the received image data to one or more pre-determined thresholds, corresponding to one or more potential threat objects, and to output information indicative of whether a potential threat item(s) has been identified based upon the comparison, for example.

The example environment 100 further comprises a terminal 130, or workstation (e.g., a computer), that may be configured to receive the image data (e.g., output by the object segmentation component 126 and/or the image reconstructor 124) and/or the information output by the threat determiner 128. The terminal 130 may also be configured to present the image data and/or information for display on a monitor 132 to a user 134 (e.g., security personnel, medical personnel, etc.). In this way, the user 134 can inspect the image(s) to identify areas of interest within the object(s) 102. The terminal 130 can also be configured to receive user input which can direct operations of the object examination apparatus 108 (e.g., a speed to rotate, a speed of a conveyor belt, etc.), for example.

In the example environment 100, a controller 136 is operably coupled to the terminal 130. In one example, the controller 136 is configured to receive input from the terminal 130, such as user input for example, and to generate instructions for the object examination apparatus 108 indicative of operations to be performed. For example, the user 134 may desire to reexamine the object(s) 102 at a different energy level, and the controller 136 may issue a command instructing the support article 112 to reverse direction (e.g., bringing the object(s) 102 back into an examination region 114 of the object examination apparatus 108).

It may be appreciated that the example component diagram is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components configured to perform additional features, functions, etc. and/or some components described herein (e.g., such as the threat determiner 128) may be optional.

Figure 2:
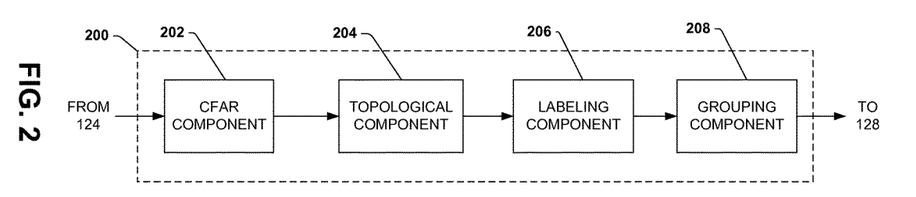
FIG. 2 illustrates an example environment of an object segmentation component.

FIG. 2 is a schematic block diagram of an example object segmentation component 200 (e.g., 126 in FIG. 1) configured to segment a sheet object from other sub-objects represented in an image. It may be appreciated that although specific reference is made to segmenting sheet objects, the object segmentation component 200 may also be configured to segment other sub-objects represented in an image, such as bulk objects, using the same components and/or other (additional) components. As illustrated, an image representative of an object under examination is received by the object segmentation component 200 from an image reconstructor (e.g., 124 in FIG. 1) or image generator and a segmented image representative of the sheet object is output from the object segmentation component 200, which may be received by a threat determiner (e.g., 128 in FIG. 1). By way of example, the image received by the object segmentation component 200 may be an image of a suitcase under examination and the image output by the object segmentation component 200 may be an image of a sheet object, such as a sheet of paper or sheet explosive, comprised within the suitcase. In this way, objects of interest may be identified that are comprised within a larger object capable of concealing the object(s) of interest.

The example object segmentation component 200 comprises a constant false alarm rate (CFAR) component 202, a topological component 204, a labeling component 206, and a grouping component 208. It may be appreciated that although the topological component 204 is illustrated as receiving data output by the CFAR component 202, in other embodiments the arrangement of the topological component and the CFAR component 202 may be different than the illustrated arrangement. For example, in another embodiment, the CFAR component 202 may receive data output by the topological component 204. In yet another embodiment, the CFAR component 202 and the topological component 204 may perform computations on the image data from the image reconstructor/generator concurrently. In such an embodiment, the CFAR component 202 and the topological component 204 may output information (directly) to the labeling component 206, for example.

The CFAR component 202 is configured to compute a CFAR score for at least some elements of an image (e.g., pixels of a two-dimensional image and/or voxels of a three-dimensional image) input into the object segmentation component 200 and is indicative of the likelihood/probability that an element is part of a sheet object. More particularly, the CFAR component 202 is configured to compare respective elements to a neighborhood of elements that neighbor the element being analyzed. For example, to compute a CFAR score for a first element (e.g., a first pixel or voxel) of the image, a value (e.g., a density value, z-effective value, Compton score value, material property value, etc.) associated with the first element may be compared to a statistical measure (e.g., mean value, medium value, mode value, etc.) for a first neighborhood of elements that neighbor the first element. The larger the difference between the value of the first element and the statistical measure (e.g., the mean value) for the first neighborhood, the higher the probability that the element represents a sheet object.

Figure 3:
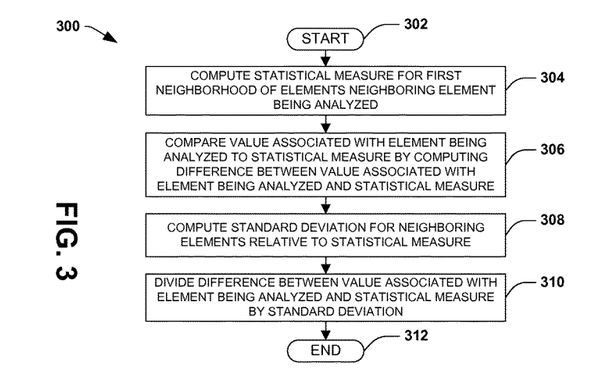
FIG. 3 illustrates a flow diagram of an example method for computing a CFAR score.

In one embodiment, the CFAR component 202 may perform an example method 300, as illustrated in FIG. 3, to compute the CFAR score of an element being analyzed (e.g., which may be repeated for each element for which a CFAR score is desired). It may be appreciated that such a method is merely an example method and is not intended to be interpreted as limiting the scope of the application, including the scope of the claims.

The example method 300 begins at 302, and a statistical measure for a first neighborhood of elements that neighbor the element being analyzed is computed at 304. The statistical measure may be, among other things, a mean value, a median value, a mode value, etc. for the neighborhood of elements. For example, in one embodiment, the statistical measure is a mean value for the neighborhood of elements, where the neighborhood includes one or more elements within a predetermined/specified spatial proximity of the element being analyzed as described above. For example, respective elements (e.g., pixels of a two-dimensional image and/or voxels of a three-dimensional image) may comprise a CT value (also referred to as a density value), and at 304 in the example method, the CT values of elements within the defined neighborhood may be averaged to compute a mean value for the neighboring elements. Typically, the defined neighborhood excludes the element being analyzed. However, in one embodiment, the defined neighborhood may include the element being analyzed and the value of the element being analyzed may contribute to the statistical measure.

At 306 in the example method 300, the value associated with the first element is compared to the statistical measure computed at 304 by computing a difference between the value associated with the element being analyzed and the statistical measure. For example, in one embodiment, the mean value of the first neighborhood is subtracted from the value associated with the element being analyzed to compute the difference. In another embodiment, the value associated with the element being analyzed is subtracted from the mean value of the first neighborhood to compute the difference. Where the difference between the value associated with the element being analyzed and the statistical measure is negative, the difference may be inversed. In this way, the absolute value of the difference resulting from the comparison performed at 306 in the example method 300 is acquired.

It may be appreciated that by computing the difference between the value associated with the element being analyzed and the statistical measure for the neighborhood, it may be determined how similar/dissimilar the element is from its neighboring elements when viewed collectively. In this way, the similarity/dissimilarity of an object represented by the element being analyzed relative to the object(s) represented by neighboring elements that comprise the first neighborhood may be determined. Typically, the higher the dissimilarly, the higher the probability that an object is a sheet object.

At 308 in the example method 300, a standard deviation for neighboring elements is computed relative to the statistical measure. By way of example where the statistical measure is the mean value for the first neighborhood, the range of values that contributed to the mean value may be compared to the mean value to compute a standard deviation relative to the mean value. The higher the standard deviation, the larger the spread of values that contributed to the mean value.

It may be appreciated that although the act of computing the standard deviation is illustrated/described as following the act of computing the difference between the value associated with the element being analyzed and the statistical measure, the order may be reversed and/or the acts may be performed concurrently. Thus, the order of the actions illustrated in the example method 300 is merely an example order and is not intended to be interpreted in a limiting manner.

At 310 in the example method 300, the difference between the value associated with the element being analyzed and the statistical measure computed at 306 is divided by the standard deviation computed at 308 to determine a CFAR score. By way of example, the difference between the value associated with the element being analyzed and the mean value may be divided by the standard deviation computed at 308 to determine the CFAR score. The higher the CFAR score, the more likely it is that the object represented by the element is a sheet object. Thus, the CFAR score is indicative of a statistical probability relating to the likelihood that an element being analyzed is representative of a sheet object.

The example method 300 ends at 312, where a CFAR score for the element being analyzed is output to a topological component 204 and/or a labeling component 206, for example.

Returning to FIG. 2, the example object segmentation component 200 further comprises a topological component 204 configured to compute a topological score for the first element by comparing the value associated with the first element to respective values associated with a second neighborhood of elements (e.g., where the first neighborhood of elements utilized to compute the CFAR score may be identical to the second neighborhood or different from the second neighborhood). That is, stated differently, the topological component 204 is configured to determine how many of the neighboring elements in the second neighborhood have a value that is within a specified threshold of the value associated with the element being analyzed. In this way, the topological component 200 provides another score (e.g., in addition to the CFAR score) from which it may be determined whether the object is a sheet object. That is, stated differently, whereas the CFAR score is indicative of a value of an element in relation to a statistical measure of a neighborhood, the topological score is indicative of the value of the element in relation to the value of respective elements in a neighborhood (e.g., when compared one-by-one to the value of the element). In this way, the CFAR score describes the relationship of an element to a neighborhood when viewed collectively and the topological score describes the relationship of the element to a neighborhood when the neighbors are compared to the element individually.

Figure 4:
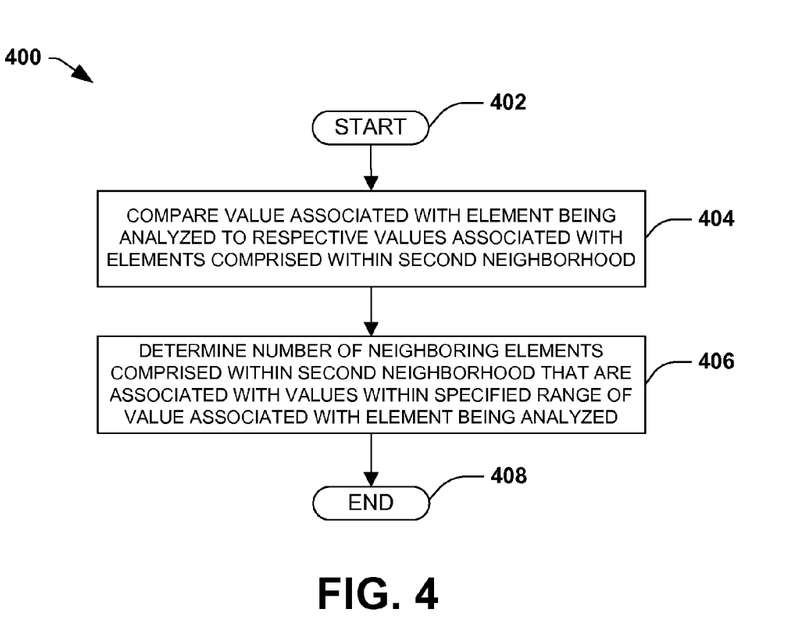
FIG. 4 illustrates a flow diagram of an example method for computing a topological score.

In one embodiment, the topological component 204 may perform an example method 400, as illustrated in FIG. 4, to compute the topological score of an element being analyzed (e.g., which may be repeated for each element for which a topological score is desired). It may be appreciated that such a method 400 is merely an example method and is not intended to be interpreted as limiting the scope of the application, including the scope of the claims.

The example method 400 begins at 402 and a value associated with the element being analyzed is compared to respective values associated with elements comprised within a second neighborhood at 404. Stated differently, the value associated with the element is compared to a corresponding value of each neighboring element that is included in the defined neighborhood. If the value of a neighboring element is within a specified deviation (e.g., a specified range) of the value associated with the element being analyzed, the neighboring element has a high probability of being representative of the same object as the element being analyzed. By way of example, a density value of the element being analyzed may be compared to a density value of a first neighboring element to determine if the density value of the first neighboring element is within a specified range of the density value of the element being analyzed. Similarly, the density value of the element being analyzed may be compared to a density value of a second neighboring element to determine if the density value of the second neighboring element is within the specified range of the element being analyzed. Such an action may be repeated until each neighboring element of the second neighborhood is compared to the element being analyzed.

At 406 in the example method 400, a number of neighboring elements of the second neighborhood associated with values within the specified range of the value associated with the element being analyzed is determined to derive a topological score. That is, it is determined how many, or rather what percentage, of the neighboring elements are associated with values within the specified range of the value associated with the element being analyzed. The smaller the number (e.g., or smaller the percentage), the more probable it is that the element being analyzed represents a sheet object, for example. Thus, the topological score is indicative of a second statistical probability relating to the likelihood that an element being analyzed is representative of a sheet object.

It may be appreciated that in another embodiment, the number of neighboring elements associated with values outside of the specified range (e.g., as opposed to within the specified range) of the value associated with the element being analyzed is determined to derive a topological score. In such an embodiment, the larger the number (e.g., or larger the percentage), the more probable it is that the element being analyzed represents a sheet object.

It may also be appreciated that the type of values utilized to compute the CFAR score are typically the same type of values utilized to compute the topological score. For example, if density values associated with the elements are utilized to compute the CFAR score, density values are typically utilized to compute the topological score. However, in one embodiment, a first type of value may be utilized to compute the CFAR score and a second type of value may be utilized to compute the topological score. For example, density values associated with elements may be utilized to compute the CFAR score while z-effective values may be utilized when computing the topological score.

The example method 400 ends at 408, where a topological score for the element being analyzed is output to a CFAR component 202 and/or a labeling component 206, for example.

Returning to FIG. 2, the example object segmentation component 200 further comprises a labeling component 206 configured to determine whether respective elements are representative of a sheet object based at least in part upon the CFAR score generated by the CFAR component 202 and the topological score generated by the topological component 204. Stated differently, when the topological score for an element being analyzed is within a specified range for topological scores and the CFAR score is within a specified range for CFAR scores, a determination may be made that the analyzed element is representative of a sheet object. When one or both of these scores are outside of the respective specified ranges, a determination may be made that the analyzed element is not representative of a sheet object, for example (e.g., to mitigate false positives). The labeling component 206 may be further configured to label or otherwise identify elements that are likely to be representative of and/or associated with a sheet object. In this way, using the two statistical probability metrics (e.g., the CFAR score and the topological score) the labeling component 206 may identify elements (e.g., pixels or voxels) that are likely to be associated with (e.g., representative of) sheet objects (e.g., where the identified elements may be combined by the grouping component 208 to segment an image of the sheet object).

The grouping component 208 of the object segmentation component 200 is configured to group one or more elements that are identified/labeled by the labeling component 206 as being associated with, or representative of, a sheet object to form a segmented image. By way of example, in one embodiment, the grouping component 208 utilizes a conventional connected components labeling (CCL) approach to group elements. In such an approach, respective elements that are labeled as being representative of a sheet object may be compared to neighboring elements also labeled as being representative of a sheet object to determine the difference between their densities, z-effective values, and/or other values from which a CCL analysis may be performed. If the difference in density, for example, is below a predetermined density difference threshold, then it may be assumed that the two neighboring elements belong to the same object (e.g., a same sheet object). Such a process may continue until at least some (and preferably all) elements labeled as being representative of sheet objects are grouped to form one or more segmented images (e.g., respectively representative of different sheet objects). In this way, one or more portions of an image may be segmented to identify objects that are potential sheet objects, and the segmented images may be transmitted to a threat determiner (e.g., 128 in FIG. 1), for example, to determine whether the sheet object is a potential threat item, such as an explosive, for example.

Figure 5:
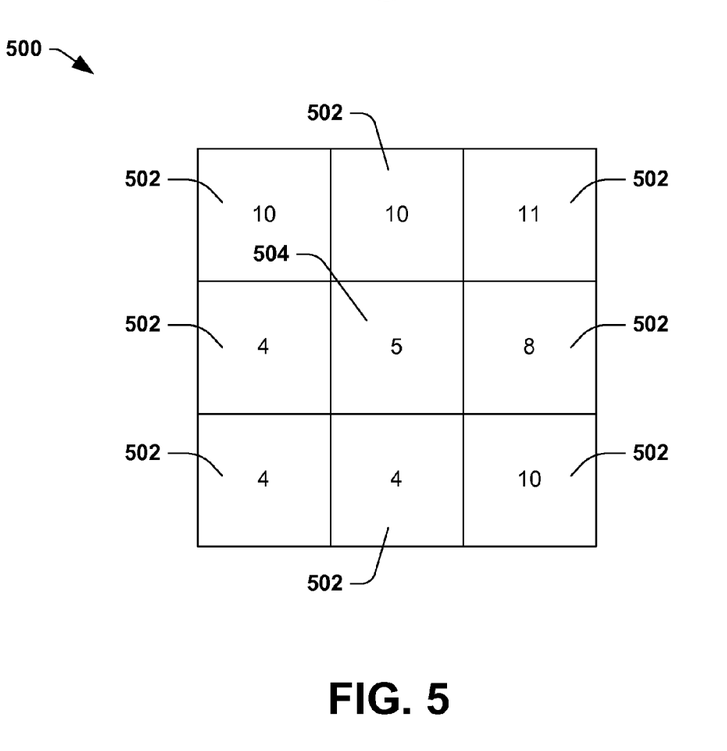
FIG. 5 illustrates an example image comprising elements respectively associated with a value.

FIG. 5 illustrates a portion of an example image 500 comprising nine pixels 502, 504, with respective pixels being associated with a value, such as a CT value, z-effective value, Compton score value, etc. To provide an example of how an object segmentation component (e.g., 200 in FIG. 2) may determine if an element is associated with a sheet object, assume that a CFAR score and a topological score are being computed for a center pixel 504 of the image 500. The neighborhood of pixels, to which the center pixel 504 is compared, may be defined as the eight pixels 502 that are adjacent the center pixel 504 (although other pixels not illustrated may be utilized and/or some pixels illustrated may not be utilized, for example). It may be appreciated that different neighborhoods of pixels, such as a first neighborhood of pixels and a second neighborhood of pixels may be used to respectively calculate CFAR and topology scores.

In this example, the CFAR score may be computed as follows (e.g., following the method 300 described with respect to FIG. 3). A statistical measure, such as a mean value, for the neighborhood may be computed. In this example, the mean value may be computed as 7.625 by averaging the values of the eight pixels 502 adjacent the center pixel 504 (10+10+11+8+10+4+4+4=61, and 61/8=7.625). A difference between the value associated with the center pixel 504 and the mean value may then be computed. In this example, the difference (in absolute terms) is 2.625. The standard deviation of the neighborhood relative to the mean value may also be computed. In this example, the standard deviation is approximately 2.91. Finally, the difference between the value associated with the center pixel 504 and the mean value may be divided by the standard deviation to derive the CFAR score. Thus, in this example, the CFAR score may be approximately 0.90 (2.625/2.91=0.90).

The topology score may be computed as follows (e.g., following the method 400 described with respect to FIG. 4). First, a threshold range is set based upon the value associated with the center pixel. For example, the threshold range may be 4-6 given that the center pixel's value is 5 (e.g., the rule for setting the threshold may be plus or minus 1 from the value of the pixel being analyzed). Pixels of the neighborhood associated with values within the threshold range may be counted as likely representative of a same object as the center pixel 504. Pixels of the neighborhood associated with values outside the threshold range may be counted as likely representative of a different object than the center pixel 504. Next, values of respective neighboring pixels may be compared to the threshold range to determine a number of neighboring pixels 502 associated with values within the threshold range of the value associated with the center pixel 504. In this illustrated example, it may be determined that 3 out of the 8 neighboring pixels 502 (e.g., or 37.5 percent of the neighborhood) are associated with values within the threshold range (e.g., and are likely representative of the same object as the center pixel 504). Thus, in this example, the topological score may be equal to 0.375 (or 37.5%) (e.g., due to the three neighboring pixels that have a value of 4).

Using the CFAR score and the topological score, it may be determined/predicted whether the center pixel 504 is representative of a sheet object. By way of example, the CFAR score may be compared to a specified CFAR range that is defined to identify pixels representative of a sheet object and the topological score may be compared to a specified topological range that is defined to identify pixels representative of a sheet object. For example, the CFAR range may be defined to be 0.85-1 and the topological range may be defined to be 0-0.15. The CFAR score and the topological score for the center pixel 504 may be compared against these ranges to determine if the center pixel 504 is representative of a sheet object. Using this criteria, it may be determined that the CFAR score for the center pixel 504 is within the CFAR range and the topological score is outside of the topological range. When one or more of the scores is outside of its specified range, the pixel may be determined to not be representative of a sheet object. As such, the center pixel 504 may not be labeled as a sheet object. It may be appreciated that if merely the CFAR score had been utilized to determine whether the center pixel 504 is representative of a sheet object, the center pixel 504 may have been (mistakenly) labeled as representative of sheet object (e.g., potentially resulting in a false positive).

Figure 6:
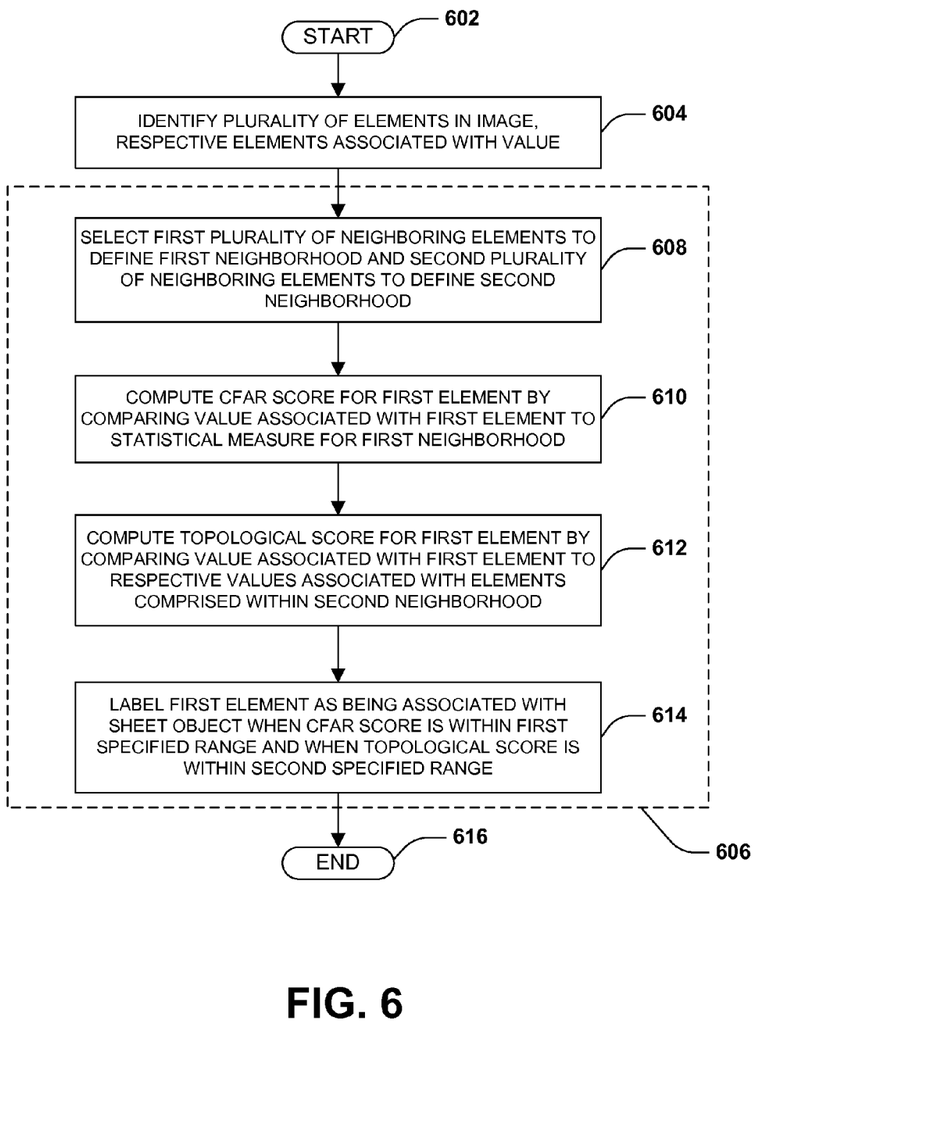
FIG. 6 illustrates a flow diagram of an example method for segmenting a sheet object from an image generated using a radiation imaging modality.

FIG. 6 illustrates an example method 600 for segmenting a sheet object from an image generated using a radiation imaging modality. More particularly, the example method 600 describes a technique for identifying/labeling an element, such as a pixel or a voxel, of an image as being associated with (e.g., representative of) a sheet object. A standard CCL approach may then be utilized to group one or more elements to segment a portion of the image representative of the sheet object from portions of the image representing other sub-objects.

The example method 600 begins at 602 and a plurality of elements in an image generated from a radiation imaging modality is identified at 604. Respective elements are associated with at least one value, such as a CT value, z-effective value, Compton score value, material property value, etc. By way of example, in one embodiment, a pre-scan may be performed to identify a region of interest within an image under examination. In such an embodiment, elements comprised within the identified region may be identified for further processing and/or segmentation (e.g., to determine if a potential threat item is comprised within the region of interest). In another embodiment, the entire image may be considered as a region of interest and the plurality of elements identified at 604 may be all or substantially all of the elements (e.g., pixels and/or voxels) that make up the image, for example.

At 606 in the example method 600, respective elements of the plurality of elements are analyzed to compute a constant false alarm rate (CFAR) score and a topological score for each element.

As an example, with respect to a first element of the plurality of element, a first plurality of neighboring elements in spatial proximity to the first element may be selected to define a first neighborhood and a second plurality of neighboring elements in spatial proximity to the first element may be selected to define a second neighborhood at 608. As described above, such neighborhoods may or may not include the first element. For example, the first and second neighborhoods of elements may be respectively defined as one or more elements adjacent to the first element and/or may be defined as some or all of the elements separated from the first element by any number of elements and the first and second neighborhoods may include or exclude the first element. Moreover, the first neighborhood (e.g., for computing the CFAR score) may be different than the second neighborhood (e.g., for computing the topological score) and/or the neighborhoods may comprise some or all of the same elements.

At 610 in the example method 600, a CFAR score may be computed for the first element. The CFAR score is determined/computed by comparing a value associated with the first element to a statistical measure for the first neighborhood of elements (e.g., such as described in the example method 300 of FIG. 3). By way of example, in one embodiment, a density value for the first element may be compared to a mean density value for the first neighborhood elements. The difference between the density value associated with the first element and the mean density value may be divided by a standard deviation of the first neighborhood relative to the mean value to derive a CFAR score indicative of a statistical probability that the first element represents a sheet object. CFAR scores within a specified range may be indicative of a high probability that the element is a sheet object. Typically, the higher the CFAR score, the greater the likelihood that an element represents a sheet object.

At 612 in the example method 600, a topological score may be computed for the first element. The topological score is determined/computed by comparing the value associated with the first element to respective values associated with elements of the second neighborhood (e.g., such as described in the example method 400 of FIG. 4). By way of example, in one embodiment, a threshold range is set based upon the value associated with the first element (e.g., to identify elements of the second neighborhood that are associated with a value that is within a specified deviation of the value associated with the first element). Respective elements associated with a value within the threshold range may be distinguished from those elements of the second neighborhood that are associated with a value outside of the threshold range, and the topological score may be computed by calculating a percentage (e.g., in decimal form) of the neighboring elements that are associated with a value within the threshold range, for example. Topological scores within a specified range may be indicative of a high probability that the element is a sheet object. Typically, the lower the topological score, the greater the likelihood than an element represents a sheet object.

It will be appreciated that although the example method 600 illustrates the act of computing the topological score 612 as following the act of computing the CFAR score 610, the order of such acts may be reversed or such acts may be performed concurrently. Moreover, in one embodiment, the second ordered act may be performed merely when the first ordered act results in a score within a specified range (e.g., indicative of a sheet object). By way of example, in one embodiment, the topological score may be computed at 612 merely when the CFAR score computed at 610 is within a specified range of CFAR scores indicative of a sheet object. In another embodiment, the CFAR score may be computed at 610 merely when the topological score computed at 612 is within a specified range of topological scores indicative of a sheet object. In this way, the number of computations performed may be reduced when it can be determined, based merely upon the CFAR score or based merely upon the topological score, that the element is not representative of a sheet object.

At 614 in the example method 600, the first element is labeled as being associated with a sheet object if the CFAR score is within the specified range of CFAR scores and the topological score is within the specified range of topological scores. Typically, if at least one of the CFAR score or the topological score are outside of their specified ranges, the probability that the element represents a sheet object is low.

The acts described at 608, 610, 612, and 614 may be repeated for respective elements identified at 604 to determine whether each of the plurality of elements is associated with (e.g., representative of) a sheet object. Thereafter, elements may be grouped using a standard connected component labeling (CCL) approach, for example, to segment a representation of a sheet object from the image (e.g., which may be representative of a plurality of sub-objects that includes the sheet object).

The example method 600 ends at 616.

Figure 7:
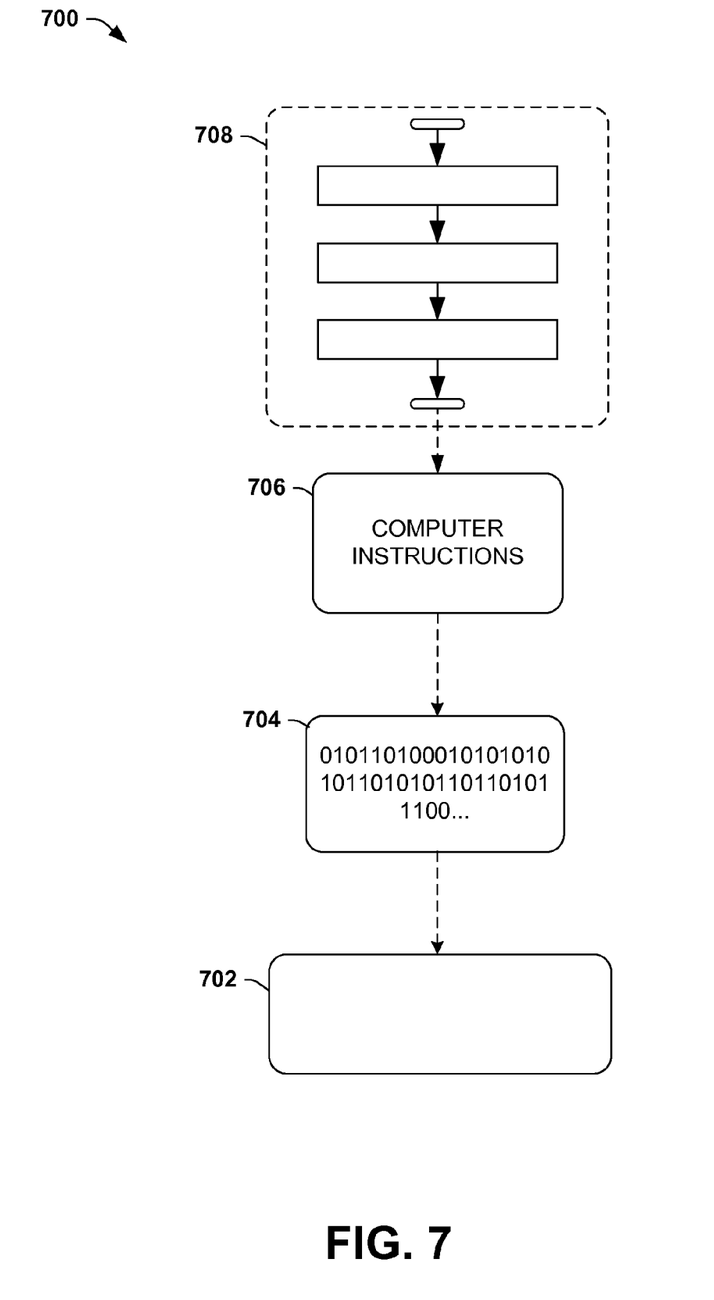
FIG. 7 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 7, wherein the implementation 700 comprises a computer-readable medium 702 (e.g., a CD-R, DVD-R, or a platter of a hard disk drive), on which is encoded computer-readable data 704. This computer-readable data 704 in turn comprises a set of processor-executable instructions 706 configured to operate according to one or more of the principles set forth herein. In one such embodiment 700, the processor-executable instructions 706 may be configured to perform a method 708, such as at least some of the example method 300 of FIG. 3, at least some of the example method 400 of FIG. 4, and/or at least some of the example method 600 of FIG. 6. In another such embodiment, the processor-executable instructions 706 may be configured to implement a system, such as at least some of the exemplary environment 100 of FIG. 1 and/or at least some of the system 200 of FIG. 2, for example. Many such computer-readable media may be devised by those of ordinary skill in the art that are configured to operate in accordance with one or more of the techniques presented herein.

It may be appreciated that "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for segmenting a sheet object represented in an image generated using radiation imaging modality, comprising:
   identifying a plurality of elements in the image, respective elements associated with a value;
   for a first element of the plurality of elements:
      selecting a first plurality of neighboring elements in spatial proximity to the first element to define a first neighborhood and a second plurality of neighboring elements in spatial proximity to the first element to define a second neighborhood;
      computing a constant false alarm rate (CFAR) score for the first element, the CFAR score determined by comparing the value associated with the first element to a statistical measure for the first neighborhood;
      computing a topological score for the first element, the topological score determined by comparing the value associated with the first element to respective values associated with elements comprised within the second neighborhood, wherein computing the topological score for the first element, comprises:
         comparing the value associated with the first element to respective values associated with elements comprised within the second neighborhood; and at least one of:
            determining a number of neighboring elements comprised within the second neighborhood that are associated with values within a specified range of the value associated with the first element; or
            determining a number of neighboring elements comprised within the second neighborhood that are associated with values outside of the specified range of the value associated with the first element; and
   labeling the first element as being associated with the sheet object when the CFAR score is within a first specified range and when the topological score is within a second specified range.

2. The method of claim 1, the first neighborhood different than the second neighborhood.

3. The method of claim 1, the statistical measure for the first neighborhood comprising a mean value for the first neighborhood.

4. The method of claim 1, identifying a plurality of elements in the image, comprising at least one of:
   identifying a plurality of voxel elements in the image; or
   identifying a plurality of pixel elements in the image.

5. The method of claim 1, wherein the value associated with respective elements is at least one of a density value, a z-effective value, a Compton score value, or a material property value.

6. The method of claim 1, computing the CFAR score for the first element, comprising:
   computing the statistical measure for the first neighborhood, the statistical measure comprising a mean value for the first neighborhood; and
   comparing the value associated with the first element to the statistical measure by computing a difference between the value associated with the first element and the mean value.

7. The method of claim 6, computing the CFAR score for the first element, comprising:
   computing a standard deviation for the first neighborhood relative to the mean value; and dividing the difference between the value associated with the first element and the mean value by the standard deviation.

8. The method of claim 1, wherein the topological score is representative of at least one of:
the number of neighboring elements comprised within the second neighborhood that are associated with values within the specified range of the value associated with the first element; or
the number of neighboring elements comprised within the second neighborhood that are associated with values outside of the specified range of the value associated with the first element.

9. The method of claim 1, the radiation imaging modality comprising a computed tomography (CT) imaging modality.

10. The method of claim 1, comprising at least one of:
computing the CFAR score and the topological score concurrently;
computing the topological score when the CFAR score is within the first specified range; or
computing the CFAR score when the topological score is within the second specified range.

11. A security imaging modality, comprising:
a processing unit; and
a computer readable medium comprising computer executable instructions that when executed by the processing unit perform operations, the operations comprising:
computing a constant false alarm rate (CFAR) score for a first element of an image by comparing a value associated with the first element to a statistical measure for a first neighborhood of elements;
computing a topological score for the first element by comparing the value associated with the first element to respective values associated with elements comprised within a second neighborhood of elements, wherein the topological score for the first element is a function of a number of neighboring elements comprised within the second neighborhood of elements that are associated with values within a specified range of the value associated with first element; and
labelling the first element as being associated with a sheet object when the CFAR score is within a first specified range and when the topological score is within a second specified range to facilitate segmenting the sheet object from other sub-objects represented in the image.

12. The security imaging modality of claim 11, wherein at least one of:
the first element is a first voxel of the image, the first neighborhood of elements comprising a first set of voxels that neighbor the first voxel, and the second neighborhood of elements comprising a second set of voxels that neighbor the first voxel, or
the first element is a first pixel of the image, the first neighborhood of elements comprising a first set of pixels that neighbor the first pixel and the second neighborhood of elements comprising a second set of pixels that neighbor the first pixel.

13. The security imaging modality of claim 11, wherein the value associated with the first element and the respective values associated with elements comprised within at least one of the first neighborhood of elements or the second neighborhood of elements are at least one of a density value, a z-effective value, a Compton score value, or a material property value.

14. The security imaging modality of claim 11, wherein computing the CFAR score comprises:
computing the statistical measure for the first neighborhood of elements, the statistical measure comprising a mean value for the first neighborhood of elements;
comparing the value associated with the first element to the statistical measure by computing a difference between the value associated with the first element and the mean value;
computing a standard deviation for the first neighborhood of elements relative to the mean value; and
dividing the difference between the value associated with the first element and the mean value by the standard deviation.

15. The security imaging modality of claim 11, wherein the security imaging modality is a computed tomography imaging modality configured to generate volumetric data and to generate the image using the volumetric data, the image being at least one of a three-dimensional image or a two-dimensional image.

16. The security imaging modality of claim 11, wherein the operations comprise at least one of:
computing the CFAR score and the topological score concurrently;
computing the topological score merely when the CFAR score is within the first specified range; or
computing the CFAR score merely when the topological score is within the second specified range.

17. The security imaging modality of claim 11, comprising an ionizing radiation source.

18. The security imaging modality of claim 11, wherein the topological score is representative of at least one of:
the number of neighboring elements comprised within the second neighborhood of elements that are associated with values within the specified range of the value associated with the first element; or
the number of neighboring elements comprised within the second neighborhood of elements that are associated with values outside of the specified range of the value associated with the first element.

19. A non-transitory computer readable medium comprising processor-executable instructions that when executed via a processing unit perform a method for identifying a sheet object comprised within an object examined by a security imaging modality, the method comprising:
identifying a plurality of elements in an image of the object, respective elements associated with a value;
for a first element of the plurality of elements:
selecting a first plurality of neighboring elements in spatial proximity to the first element to define a first neighborhood and a second plurality of neighboring elements in spatial proximity to the first element to define a second neighborhood;
computing a constant false alarm rate (CFAR) score for the first element, the CFAR score determined by comparing the value associated with the first element to a statistical measure for the first neighborhood;
computing a topological score for the first element, the topological score determined by comparing the value associated with the first element to respective values associated with elements comprised within the second neighborhood, wherein the topological score for the first element is a function of a number of neighboring elements comprised within the second neighborhood that are associated with values within a specified range of the value associated with first element; and labeling the first element as being associated with the sheet object when the CFAR score is within a first specified range and when the topological score is within a second specified range.

20. The non-transitory computer readable medium of claim 19, wherein the topological score is representative of at least one of:

the number of neighboring elements comprised within the second neighborhood that are associated with values within the specified range of the value associated with the first element; or the number of neighboring elements comprised within the second neighborhood that are associated with values outside of the specified range of the value associated with the first element.

* * * * *